Oct. 18, 1927.  
A. G. ANDREWS  
1,646,179  
DISH DRIER  
Filed July 17, 1924
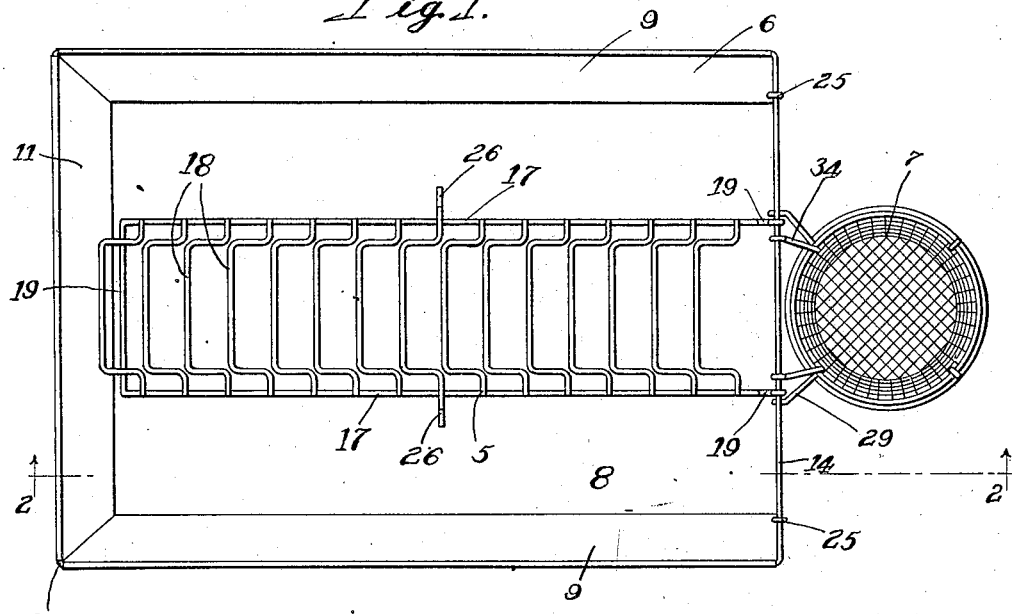
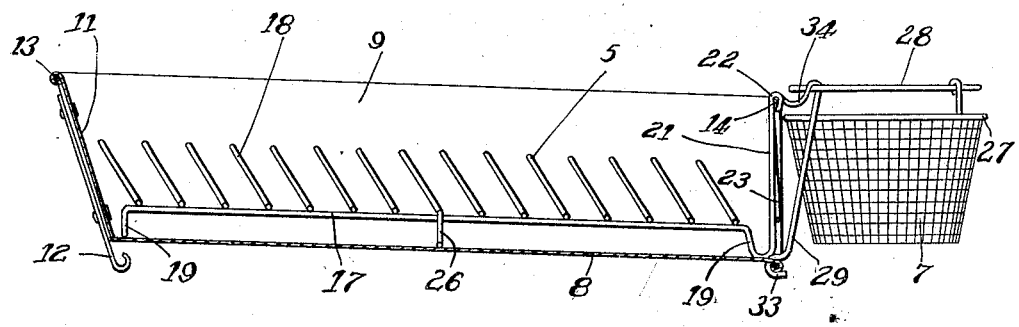
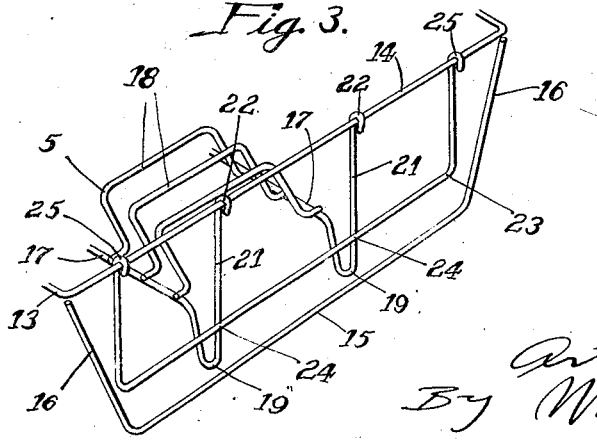
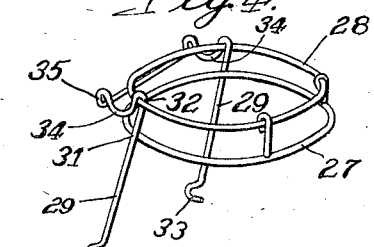
Inventor:  
Arthur G. Andrews  
By Wilson & McCune  
Attys.

Patented Oct. 18, 1927.

1,646,179

UNITED STATES PATENT OFFICE.

ARTHUR G. ANDREWS, OF ROCKFORD, ILLINOIS, ASSIGNOR TO THE WASHBURN COMPANY, OF WORCESTER, MASSACHUSETTS, A CORPORATION OF MASSACHUSETTS.

DISH DRIER.

Application filed July 17, 1924. Serial No. 726,437.

This invention relates in general to washing apparatus and has more particular reference to dish drainers or driers as they are commonly known, for holding washed dishes and silverware while hot water is poured over them for final cleaning and while they drain and dry.

The primary purpose of my invention is to provide an improved dish drier of the character described especially adapted for household use, that is, for the dishes and silverware of the average family, for facilitating the drying thereof.

My improvements consist, generally stated, in the provision of a dish drier characterized by a drain pan, a dish-supporting tray and a silverware basket constructed and assembled in a particularly advantageous manner. The dish tray is so constructed as to support the plates, saucers and other shallow dishes along the center of the drain pan and allow space at both sides for the larger dishes. Said tray is also adapted to be swung out of its operative position in the pan to permit cleaning thereof. The silverware basket is supported at the outer edge of the pan so as not to restrict the dish-supporting area thereof and is preferably detachable or removable from its operative position for convenience in packing and shipping and is positioned in alignment with the tray for more efficient use as will appear hereinafter.

Other features of my invention reside in the simplicity of construction of the drain pan, dish tray and silverware basket with the view to economy in the cost of production and to promoting the objects above mentioned.

Other objects and attendant advantages will be appreciated by those skilled in this art as the invention becomes better understood by reference to the following description when considered in connection with the accompanying drawing, in which Figure 1, is a top view of a dish drier embodying my invention;

Fig. 2, is a longitudinal sectional view through the drier taken substantially on the line 2—2 of Fig. 1; and Figs. 3 and 4 are detail perspective views of the pivoted end of the dish tray and silverware basket, respectively.

Referring more particularly to the drawing, it will be observed that the plates, saucers and other shallow dishes will be directly supported by a tray 5, which is carried in a drain pan 6, and that the silverware is adapted to be carried by a basket or tray 7, likewise carried by the drain pan, these reference numerals being generally applied. The dish tray supports the plates, saucers etc., in an upright inclined position in nested relation so that when hot water is poured on the dishes as from a tea kettle it will easily drain off. The pan 6 has an inclined bottom so that the water will drain off at the lower end which is open. The remaining sides of the pan are imperforate or closed to prevent the water from splashing. By positioning the dish tray in the center of the pan space is provided at each side of the tray for the larger dishes. By locating the silverware basket at the exterior of the pan the dish supporting area thereof is not restricted and, furthermore, by positioning the silverware basket in alignment with and in close proximity to the dish tray an economy in water consumption is effected by reason of the fact that both the articles in the tray and basket may be drenched by water poured from a tea kettle by motion thereof back and forth in a single plane and by splashing of the water through the open end of the pan from the articles in the tray to those in the basket, and vice versa. The dish tray is held so as not to shift sidewise in the pan and the space at each side of the tray is adapted for carrying the larger dishes.

The pan 6, preferably rectangular, has closed imperforate sides except at its lower end which is open. As shown the pan is formed of sheet metal having a bottom 8, longitudinal sides 9 and an end 11, the pan being supported by legs 12 in an inclined position so that the water will drain off at the open end. The upper edges or rim of the pan are turned down over a reenforcing wire 13 which has a portion 14 traversing the open end of the pan. The pan is further reenforced at its open end by a wire having a base portion 15 and upstanding sides 16 over which the contiguous edges of the pan are turned, this wire being shown in Fig. 3 removed from the pan.

The dish-supporting tray is composed in the preferred embodiment of longitudinal wires 17 and cross wires 18 welded or otherwise secured at their ends to the longitudinal wires and arched in an inclined plane, as plainly shown, for supporting shallow dishes in inclined nested relation as explained above. In the present instance the wires 17 are in a single piece shaped to provide leg portions 19 and ends 21 turned upwardly and being pivotally attached at 22 to the portion 14 of the pan reenforcing wire. The dish tray is therefore adapted to be swung into and out of its operative position in the pan and when swung out of such position permits the pan to be readily cleaned. In order to prevent the dishes in the spaces at the sides of the dish tray from being displaced through the open end of the pan I have provided suitable dish retaining means preferably in the form of a wire member 23 welded or otherwise secured at 24 to the upright portions 21 of the dish tray and pivotally secured at 25 to the end portion 14 of the pan reenforcing wire. The angular portions formed by this wire member 23 reach across the openings at the sides of the dish tray and prevent displacement of dishes through such openings. The member 23 is therefore an integral part of the dish tray and by contact at its corners with the adjacent side walls 9 they serve to prevent lateral or sidewise shifting of the dish tray in the drain pan. In order to support the dish tray intermediate the legs 19 one of the cross wires 18 is extended at its ends to provide legs 26 which rest on the bottom of the pan.

The silverware basket or tray 7 may be of any suitable or preferred shape such for example as a wire basket as shown. In this instance double rim members 27 and 28 are provided in spaced relation at the top of the basket and the latter is detachably connected to the pan by a specially constructed bracket preferably formed of a single piece of wire. This wire member is shaped to provide relatively long supporting arms 29 secured at 31 and 32 to the lower and upper rims 27 and 28 respectively and having hooked lower ends 33 adapted to pass through small openings in the bottom 8 of the pan and to embrace the reenforced lower edge thereof in a supporting but detachable connection. The intermediate portion of said wire bracket member is shaped to provide shorter arms 34 terminating in a hooked end 35 adapted to snap over the wire 14 of the pan. It will be noted that the hooked end 35 snaps over the wire 14 in the normal position of the latter and that in order to insure against disconnection of the hooked end 35 the wire 14 is flexed upwardly so as to hold it and the arms 34 under tension. This is accomplished by making the upright portions 21 of the dish tray of such length that when the tray is swung to its operative position the legs 19 adjacent to said portions 21 will engage the bottom of the pan and force the wire 14 upward. Thus by attaching the silverware basket in its operative position and swinging the dish tray to its operative position the silverware basket will be locked from displacement.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which—

I claim:

1. A dish drier comprising, in combination, an inclined drain pan having closed sides except at its lower end which is open, a reenforcing wire for the upper edge of the drain pan extending across the open end, a dish tray composed of longitudinal wires and cross wires, the longitudinal wires being turned upwardly at the lower end of the pan and pivotally attached to the reenforcing wire, and a dish-retaining wire having a horizontal portion united to the upright ends of the longitudinal wires and being turned upwardly laterally beyond said longitudinal wires and pivotally attached at their upper ends to said reenforcing wire.

2. In a dish drier comprising a sheet metal drain pan closed on all sides excepting one end through which the pan drains, wire reinforcing the edges of the pan on the ends and sides thereof, and a dish tray composed of longitudinal supporting wires with cross wires mounted thereon, said tray having the longitudinal wires bent upwardly at one end of the pan and pivotally attached to the reinforcing wire whereby the tray is swingable out of the pan to afford a clean sweep of the pan from the closed end out through the opposite open end.

3. A dish drier comprising a sheet metal pan closed on all sides except one end through which the pan is arranged to drain, a one-piece wire frame reinforcing the edges of the pan on all sides thereof and extending across the open end, and a dish tray composed of longitudinal supporting wires and cross wires, the longitudinal wires being bent upwardly at the one end of the pan and pivotally attached to the reinforcing wire frame.

ARTHUR G. ANDREWS.